United States Patent
Nitsan et al.

(10) Patent No.: US 10,313,459 B2
(45) Date of Patent: Jun. 4, 2019

(54) MONITORING APPLICATION FLOW OF APPLICATIONS USING A REGULAR OR EXTENDED MODE

(71) Applicant: HEWLETT PACKARD ENTERPRISE DEVELOPMENT LP, Houston, TX (US)

(72) Inventors: Amichai Nitsan, Yehud (IL); Eyal Kenigsberg, Yehud (IL); Michael Gopshtein, Yehud (IL)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 190 days.

(21) Appl. No.: 15/128,081

(22) PCT Filed: Apr. 29, 2014

(86) PCT No.: PCT/US2014/035913
§ 371 (c)(1),
(2) Date: Sep. 21, 2016

(87) PCT Pub. No.: WO2015/167469
PCT Pub. Date: Nov. 5, 2015

(65) Prior Publication Data
US 2017/0093995 A1    Mar. 30, 2017

(51) Int. Cl.
| | | |
|---|---|---|
| *G06F 15/173* | (2006.01) | |
| *H04L 29/08* | (2006.01) | |
| *G06F 11/34* | (2006.01) | |
| *G06F 11/30* | (2006.01) | |
| *H04L 12/26* | (2006.01) | |

(52) U.S. Cl.
CPC .......... *H04L 67/22* (2013.01); *G06F 11/3003* (2013.01); *G06F 11/3072* (2013.01); *G06F 11/3466* (2013.01); *H04L 43/12* (2013.01); *G06F 2201/865* (2013.01); *H04L 43/0811* (2013.01)

(58) Field of Classification Search
USPC ........................................................ 709/226
See application file for complete search history.

(56) References Cited

U.S. PATENT DOCUMENTS 5,758,077 A * 5/1998 Danahy ................. G06F 9/5055
709/201
5,958,010 A * 9/1999 Agarwal ................. H04L 43/12
709/223
(Continued)

OTHER PUBLICATIONS

Hill, D. et al., "Chapter 4—Occasionally Connected Smart Clients," (Web Page), Microsoft Developer Network, Jun. 15, 2004, 48 pages, available at http://msdn.microsoft.com/en-us/library/ff650163.aspx.
(Continued)

*Primary Examiner* — Alicia Baturay

(57) ABSTRACT

Example embodiments relate to monitoring application flow of an application responsive to receiving a monitoring mode upon launch of a session of the application. In this manner, the embodiments disclosed herein enable monitoring an application on a first computing device based on a first received monitoring mode and monitoring the same application on a second computing device based on a second received monitoring mode.

13 Claims, 11 Drawing Sheets

(56) References Cited

U.S. PATENT DOCUMENTS

| | | | | |
|---|---|---|---|---|
| 5,987,611 | A * | 11/1999 | Freund | G06F 21/552 |
| | | | | 726/4 |
| 6,412,001 | B1 * | 6/2002 | Wong | G06F 11/3409 |
| | | | | 709/224 |
| 6,760,903 | B1 * | 7/2004 | Morshed | G06F 11/3466 |
| | | | | 717/130 |
| 7,055,101 | B2 * | 5/2006 | Abbott | G06F 1/163 |
| | | | | 715/744 |
| 7,076,547 | B1 | 7/2006 | Black | |
| 7,107,539 | B2 * | 9/2006 | Abbott | G06F 1/163 |
| | | | | 706/10 |
| 7,970,411 | B2 * | 6/2011 | Pande | G01S 5/0027 |
| | | | | 342/352 |
| 8,099,490 | B2 | 1/2012 | Deakin | |
| 8,108,623 | B2 | 1/2012 | Krishnaprasad et al. | |
| 8,195,760 | B2 * | 6/2012 | Lacapra | G06F 11/1076 |
| | | | | 709/214 |
| 8,589,425 | B2 | 11/2013 | Gonzalez et al. | |
| 8,893,253 | B2 * | 11/2014 | Cianfrocca | H04L 63/0245 |
| | | | | 726/11 |
| 9,240,934 | B2 * | 1/2016 | Bishop | H04L 43/0823 |
| 9,276,819 | B2 * | 3/2016 | Maon | H04L 41/14 |
| 9,305,166 | B2 * | 4/2016 | Kastner | G06F 21/556 |
| 9,537,957 | B2 * | 1/2017 | Zawacki | H04L 67/14 |
| 2001/0015975 | A1 * | 8/2001 | Kikuchi | H04L 12/14 |
| | | | | 370/389 |
| 2004/0064530 | A1 | 4/2004 | McKeon et al. | |
| 2005/0136897 | A1 * | 6/2005 | Praveenkumar | H04L 29/06 |
| | | | | 455/414.1 |
| 2007/0171827 | A1 | 7/2007 | Scott et al. | |
| 2007/0197878 | A1 * | 8/2007 | Shklarski | A61B 5/02055 |
| | | | | 600/300 |
| 2008/0027679 | A1 * | 1/2008 | Shklarski | A61B 5/681 |
| | | | | 702/182 |
| 2008/0294058 | A1 * | 11/2008 | Shklarski | A61B 5/02055 |
| | | | | 600/502 |
| 2008/0307477 | A1 | 12/2008 | Omernick | |
| 2010/0121972 | A1 | 5/2010 | Samuels et al. | |
| 2010/0177650 | A1 | 7/2010 | Wittgreffe | |
| 2011/0238825 | A1 | 9/2011 | Maffione et al. | |
| 2011/0264650 | A1 | 10/2011 | Tobin et al. | |
| 2013/0165180 | A1 * | 6/2013 | Fukuda Kelley | G05B 19/02 |
| | | | | 455/556.1 |
| 2013/0332603 | A1 | 12/2013 | Hutten | |
| 2015/0088957 | A1 * | 3/2015 | Kuo | H04L 67/10 |
| | | | | 709/201 |
| 2016/0350197 | A1 | 12/2016 | Amichai et al. | |
| 2017/0093995 | A1 * | 3/2017 | Nitsan | H04L 67/22 |

OTHER PUBLICATIONS

International Search Report & Written Opinion received in PCT Application No. PCT/US2014/035913, dated Jan. 15, 2015, 11 pages.

Barb Darrow, "How New Relic plans to do much, much more with all that app data", Oct. 24, 2013, 4 pages. <http://gigaom.com/2013/10/24/how-new-relic-plans-to-do-much-much-more-with-all-that-app-data/>.

* cited by examiner

MONITORING APPLICATION FLOW OF APPLICATIONS USING A REGULAR OR EXTENDED MODE

BACKGROUND

Client-side monitoring tools collect data from an application at the client side and send that data to a server for analysis. The breadth and depth of information collected by a client-side monitoring tool may be limited due to the amount of bandwidth consumed by the tool, the toll that the tool takes on the battery life of the client device and/or on other ways in which the tool negatively impacts the performance of the client device.

BRIEF DESCRIPTION OF THE DRAWINGS

The following detailed description references the drawings, wherein.

DETAILED DESCRIPTION

Figure 1:
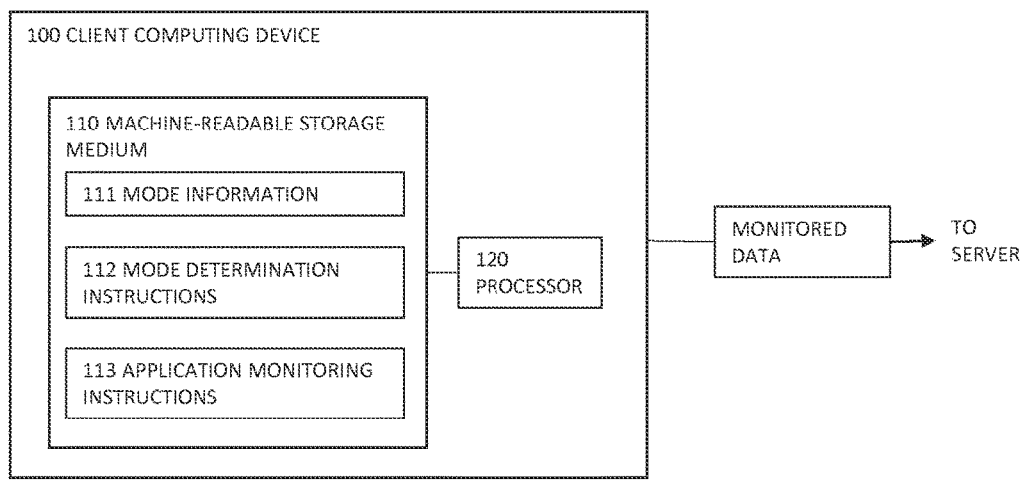
FIG. 1 is a block diagram of an example client computing device for monitoring applications running on the client computing device.

The following detailed description refers to the accompanying drawings. Wherever possible, the same reference numbers are used in the drawings and the following description to refer to the same or similar parts. While several examples are described in this document, modifications, adaptations, and other implementations are possible. Accordingly, the following detailed description does not limit the disclosed examples. Instead, the proper scope of the disclosed examples may be defined by the appended claims.

As detailed above, application owners, application developers, and other interested parties often want to analyze their application. To that end, these parties often rely on client-side monitoring tools to collect data from an application at the client side and send that data to a server for analysis. Example monitoring tools may collect all traffic and data being processed in relation to an application and pass the collected information to a server for analysis. The data collected by a monitoring tool may be identical across client devices for a particular application. For instance, an example monitoring tool may collect the same information from an application running on a first client device as from a second client device. The type and amount of data may be restricted, as mentioned above, based on the amount of bandwidth consuming by the example monitoring tool, the battery life toll of the example monitoring tool, and/or other issues related to the tool.

Example embodiments disclosed herein address these issues by instrumenting an application running on a client device to monitor application flow of that application. Upon launch of a new session of the application, the client device may request a monitoring mode from a server and may monitor application flow based on the received monitoring mode. The server may be a predetermined server made available by the application, a server from which the application was procured, and/or another server communicably coupled to the client device via the application.

The monitoring mode may be one of several monitoring modes. For example, the monitoring mode may be a regular mode, an extended mode, and/or other monitoring mode. The regular mode may be a default mode by which application flow is monitored. The extended mode may be a special mode by which application flow is monitored. For example, the extended mode may be customized such that the extended mode is entered based on one or more predetermined conditions being met. In another example, the extended mode may be entered based on random selection by the server of a client device requesting a mode indication.

The client device may monitor application flow based on the received mode from the server. The client device may send information related to the application flow to the server, which may then analyze the received information to determine and optimize user experience.

Referring now to the drawings, FIG. 1 is a block diagram of an example client computing device 100 for monitoring an application running on the client computing device 100. Client computing device 100 may be any computing device accessible to a server computing device, such as server computing device 200 of FIG. 2, over the Internet. In the embodiment of FIG. 1, client computing device 100 includes a non-transitory machine-readable storage medium 110 and a processor 120.

Processor 120 may be one or more central processing units (CPUs), microprocessors, and/or other hardware devices suitable for retrieval and execution of instructions stored in machine-readable storage medium 110. Processor 120 may fetch, decode, and execute program instructions 112, 113, and/or other instructions to enable monitoring of applications running on the client computing device 100, as described below. As an alternative or in addition to retrieving and executing instructions, processor 110 may include one or more electronic circuits comprising a number of electronic components for performing the functionality of one or more of instructions 112, 113, and/or other instructions.

In one example, the program instructions 112, 113, and/or other instructions can be part of an installation package that can be executed by processor 120 to implement the functionality described herein. In this case, memory 110 may be a portable medium such as a CD, DVD, or flash drive or a memory maintained by the server computing device 200 from which the installation package can be downloaded and installed. In another example, the program instructions may be part of an application or applications already installed on client computing device 100.

Machine-readable storage medium 110 may be any hardware storage device for maintaining data accessible to client computing device 100. For example, machine-readable storage medium 110 may include one or more hard disk drives, solid state drives, tape drives, and/or any other storage devices. The storage devices may be located in client computing device 100 and/or in another device in communication with server 200. As detailed below, storage medium 110 may maintain and/or store the data and information described herein.

For example, machine-readable storage medium 110 may be any electronic, magnetic, optical, or other physical storage device that stores executable instructions. Thus, machine-readable storage medium 110 may be, for example, Random Access Memory (RAM), an Electrically-Erasable Programmable Read-Only Memory (EEPROM), a storage drive, an optical disc, and the like. As described in detail below, machine-readable storage medium 110 may be encoded with executable instructions for monitoring application flow to determine user experience of an application.

Machine-readable storage medium 110 may store mode information 111, described in further detail below. The mode information may be used by the client computing device 100 to monitor applications running on the client computing device 100.

Mode determination instructions 112, when executed by processor 120, may determine a monitoring mode by which the application flow of an application may be monitored. The mode determination instructions 112, when executed by processor 120, may determine a monitoring mode by requesting a monitoring mode from a server communicably coupled to the client computing device 100. For example, the mode determination instructions 112, when executed by processor 120, may request a monitoring mode from the server responsive to a new session of the application being launched.

In some examples, the request to the server 200 may comprise information related to previous application flow information monitored by the client computing device 100. In some examples, the request to the server may include state data of the application, characteristics of the application, characteristics of the client computing device 100, and/or other information relating to the application running on the client computing device 100.

Responsive to requesting the monitoring mode, the mode determination instructions 112, when executed by processor 120, may receive an indication of a monitoring mode. The indication of the monitoring mode may comprise, for example, an indication to monitor the application in regular mode, an indication to monitor the application in extended mode, and/or another type of indication related to monitoring the application.

In some examples, the mode determination instructions 112, when executed by processor 120, may receive information related to how to monitor application flow in the manner of the indicated monitoring mode. For example, the mode determination instructions 112, when executed by processor 120, may also receive current mode information, and/or other information related to monitoring application flow from the server. Mode information 111, as described in further detail below, may comprise information related to each of the modes by which the application may be monitored, as well as parameters to monitor for an individual mode, conditions based on which a monitoring mode may be determined, and/or other information related to monitoring modes.

Type of monitoring modes may include, for example, a regular mode, an extended mode, and/or other mode by which application flow of an application may be monitored. A regular mode may be a default mode by which application flow of an application is monitored. An extended mode may be a special mode by which application flow of an application is monitored. The extended mode may be used responsive to the client computing device 100 determining that the application flow of the application should be monitored in an extended mode. Other modes may be used responsive to determining that another mode should be used.

Monitoring an application in extended mode may comprise obtaining different information than the information obtained by monitoring an application in standard mode. For example, monitoring an application in extended mode may comprise obtaining additional information along with the information obtained by monitoring an application in standard mode. In another example, the amount of information obtained by monitoring an application in extended mode and standard mode may be the same, but the information monitored may be different. In some examples, monitoring an application in extended mode may obtain more depth of information in a certain area and less depth of information in another area as compared to monitoring an application in standard mode.

In some examples responsive to receiving current mode information from the server computing device 200, the mode determination instructions 112, when executed by processor 120, may store the current mode information. The mode determination instructions 112, when executed by processor 120, may use the current mode information to determine whether to monitor an application associated with the current mode information in regular mode, extended mode, and/or another mode. In some of these examples, the mode determination instructions 112, when executed by processor 120, may determine the mode by which to monitor the application and check the determined mode against the indicated mode received by the server computing device 200. In some of these examples, the server computing device 200 may send the current mode information but may not send the indication of a monitoring mode. In these examples, the mode determination instructions 112, when executed by processor 120, may use the determined monitoring mode as the monitoring mode by which to monitor the application.

Application monitoring instructions 113, when executed by processor 120, may monitor the application flow of the application. The application monitoring instructions 113, when executed by processor 120, may monitor the first application responsive to receiving the indicated monitoring mode. For example, the application monitoring instructions 113, when executed by processor 120, may monitor the application in a regular mode by obtaining predetermined information related to application flow of the application, wherein the predetermined information is associated with the regular mode. In another example, the application monitoring instructions 113, when executed by processor 120, may monitor the application in an extended mode by obtaining a different predetermined set of information related to application flow of the application, wherein the different predetermined set of information may be associated with the extended mode and/or any information received with the indication to monitor the application in extended mode.

The information obtained by monitoring an application in standard mode may be based on a predetermined set of information associated with standard mode. The predetermined set of information associated with standard mode may be stored at the machine-readable storage medium 120, may be obtained from another computing device (e.g., server 200), may be obtained by an application owner and/or other interested party, and/or may be otherwise determined.

The information obtained by monitoring an application in extended mode may be determined in various ways. In some examples, there may be a default predetermined set of information associated with extended mode. In some of these examples, the default predetermined set of information associated with extended mode may be used responsive to no additional information being received with the indication of extended mode. In other examples, the information to be obtained during extended mode may be determined based on mode information 111 (as described below).

In some examples, when the mode determination instructions 112, executed by processor 120, receive an indication to monitor the application in extended mode, information related to the extended mode may also be received. Information related to the extended mode may comprise, for example, a rationale as to why the application should be monitored in extended mode, a set of conditions associated with extended mode, customer criteria associated with extended mode, mode information, and/or other information related to monitoring the application in extended mode. The application monitoring instructions 113, when executed by processor 120, may use the received information related to extended mode to determine what information to obtain during monitoring of application flow. For example, the application monitoring instructions 113, when executed by processor 120, may use the mode information to determine what information to obtain during monitoring of application flow.

In some examples, the mode information may comprise additional predetermined sets of information. For example, an additional predetermined set of information may be associated with each condition in the set of conditions based on which the application would be monitored in the extended mode. In another example, an additional predetermined set of information may be associated with each set of criteria received by a customer. A customer may be, for example, an application owner, an application developer, an entity authorized by an application owner, and/or other third party with an interest in the application being monitored.

In another example, additional predetermined sets of information may each be associated with customer criteria obtained from customers, where the application may be monitored in extended mode based on a set of customer criteria being met. The received information may include information related to a particular set of customer criteria, which may be correlated and/or otherwise associated with the additional predetermined sets of information, to determine what information to obtain during monitoring of application flow. Other ways of determining what information to obtain from the application during extended mode may also be used.

A predetermined set of information may comprise, for example, a set of parameters for which values may be obtained during monitoring of the application flow. The predetermined set of information may also comprise, for example, any other information to be obtained during monitoring of the application, time periods during which information is to be monitored, actions that precipitate the obtaining of information, and/or other information related to monitoring application flow.

The application monitoring instructions 113, when executed by processor 120, may send the obtained information (e.g., the monitored information of the application flow) to the server computing device 200. In some examples, along with the obtained information, the application monitoring instructions 113, when executed by processor 120, may send a mode indication, client computing device characteristics, application characteristics, and/or other information relevant to the running of the application on the client computing device 100. The application monitoring instructions 113, when executed by processor 120, may also store the obtained information (e.g., the monitored information) locally at the machine-readable storage medium 110).

In some examples, the application monitoring instructions 113, when executed by processor 120, may compare the information obtained during monitoring with the set of conditions, customer criteria, and/or other information based on which the application may be monitored in extended mode. Responsive to the application being monitored in regular mode and determining that the application may be monitored in extended mode based on the obtained information, the application monitoring instructions 113, when executed by processor 120, may monitor the application in extended mode, may send an indication to the server computing device 200 that the application may be monitored in extended mode, may send a request for a monitoring mode to the server computing device 200 with the obtained information, and/or may otherwise attempt to monitor the application in extended mode.

Responsive to the application being monitored in extended mode, the application monitoring instructions 113, when executed by processor 120, may determine whether the obtained information meets an end condition associated with extended mode. Responsive to the end condition being met, the application monitoring instructions 113, when executed by processor 120, may monitor the application in regular mode. For example, each condition of the set of conditions based on which the application is monitored in extended mode may be associated with an end condition which, when met, indicates that the application should no longer be monitored in extended mode. In another example, the application monitoring instructions 113, when executed by processor 120, may receive the end condition as an indication from the server computing device 200. In another example, the end condition may be received with the current mode information and/or indication of monitoring mode from the server computing device 200. The end condition may be determined in other ways as well and is not limited to the examples described herein.

In some examples, the application monitoring instructions 113, when executed by processor 120, may end monitoring of the application flow responsive to receiving an indication from the server computing device 200 to end monitoring of the application.

Figure 2:
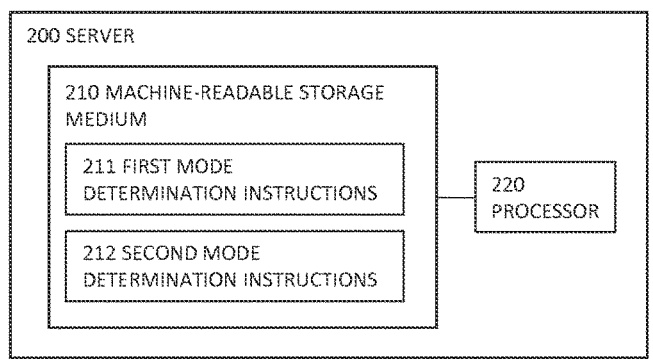
FIG. 2 is a block diagram of an example server computing device for monitoring applications running on a plurality of client computing devices.

Referring now to the drawings, FIG. 2 is a block diagram of an example server computing device 200 for determining user experience of an application running on the server computing device 200. Server computing device 200 may be any computing device accessible to a client computing device, such as client computing device 100 of FIG. 1, over the Internet. In the embodiment of FIG. 2, server computing device 200 includes a processor 220 and a machine-readable storage medium 210.

Processor 220 may be one or more central processing units (CPUs), microprocessors, and/or other hardware devices suitable for retrieval and execution of instructions stored in machine-readable storage medium 210. Processor 220 may fetch, decode, and execute program instructions 211, 212, and/or other instructions to enable monitoring of applications running on the server computing device 200, as described below. As an alternative or in addition to retrieving and executing instructions, processor 220 may include one or more electronic circuits comprising a number of electronic components for performing the functionality of one or more of instructions 211, 212, and/or other instructions.

In one example, the instructions 211, 212, and/or other instructions can be part of an installation package that can be executed by processor 220 to implement the functionality described herein. In this case, memory 210 may be a portable medium such as a CD, DVD, or flash drive or a memory maintained by another server computing device from which the installation package can be downloaded and installed. In another example, the program instructions may be part of an application or applications already installed on server computing device 200.

Machine-readable storage medium 210 may be any hardware storage device for maintaining data accessible to server computing device 200. For example, machine-readable storage medium 210 may include one or more hard disk drives, solid state drives, tape drives, and/or any other storage devices. The storage devices may be located in server computing device 200 and/or in another device in communication with server 200. As detailed below, storage medium 210 may maintain and/or store the data and information described herein.

For example, machine-readable storage medium 210 may be any electronic, magnetic, optical, or other physical storage device that stores executable instructions. Thus, machine-readable storage medium 210 may be, for example, Random Access Memory (RAM), an Electrically-Erasable Programmable Read-Only Memory (EEPROM), a storage drive, an optical disc, and the like. As described in detail below, machine-readable storage medium 210 may be encoded with executable instructions for determining user experience of an application.

Machine-readable storage medium 210 may store mode information 211 as well as first mode determination instructions 212, first mode determination instructions 213, and/or other instructions that may be used to carry out the functionality of the invention.

First mode determination instructions 212, when executed by processor 210, may determine a first monitoring mode by which application flow for a first application on a first client computing device 100 is monitored, wherein the first monitoring mode is one of a regular mode, an extended mode, and/or other monitoring mode. The first mode determination instructions 212, when executed by processor 210, may determine a first monitoring mode for a first application running on a first client computing device 100 responsive to receiving a request from the first client computing device 100 for a monitoring mode.

In some examples, the request may comprise monitoring information related to application flow for the first application running on the first client computing device 100. In some examples, the request may not comprise additional information.

The first mode determination instructions 212, when executed by processor 210, may determine a monitoring mode for the first application in various manners. The first mode determination instructions 212, when executed by processor 210, may determine the monitoring mode for the first application based on mode information 211 stored at the server computing device 200, based on received customer preferences, based on random selection, and/or based on other manners of determination.

For example, the first mode determination instructions 212, when executed by processor 210, may determine that the first monitoring mode comprises the extended mode based on random selection of the first client computing device 100 to be monitored in extended mode. In another example, the first mode determination instructions 212, when executed by processor 210, may determine that the first monitoring mode comprises the regular mode based on random selection of the first client computing device 100 to be monitored in regular mode.

In another example, the first mode determination instructions 212, when executed by processor 210, may determine that the first monitoring mode comprises the extended mode based on at least a portion of the received monitoring information meeting a predetermined condition of a set of conditions associated with the extended mode. An individual condition may comprise, for example, a set of information that may match a portion of the received monitoring information, characteristics of the first application running on the first client computing device 100, characteristics of the first client computing device 100, and/or other information related to the first application. In some examples, each individual condition may be associated with a predetermined set of information to be monitored in extended mode responsive to the condition being met.

The first mode determination instructions 212, when executed by processor 210, may send to the requesting first client computing device 100 an indication to monitor the application in extended mode, along with the individual condition that was met, the set of predetermined information associated with the condition, and/or other information related to the condition that was met responsive to an individual condition being met.

In another example, the first mode determination instructions 212, when executed by processor 210, may determine that the first monitoring mode comprises the regular mode based on the received monitoring information not meeting any of the predetermined conditions of the set of conditions associated with the extended mode.

In yet another example, the first mode determination instructions 212, when executed by processor 210, may determine that the first monitoring mode comprises the extended mode based on a portion of the received monitoring information meeting a predetermined set of criteria received from a customer. A customer may comprise, for example, an application owner, an application developer, an entity authorized by the application owner, and/or other third party with an interest in the application.

An individual set of customer criteria may comprise, for example, a set of information that may match a portion of the received monitoring information, characteristics of the first application running on the first client computing device 100, characteristics of the first client computing device 100, a ratio of client computing devices to be monitored in extended mode as compared to regular mode, a predetermined number of client computing devices to be monitored in extended mode, a total amount of bandwidth to be used for application flow monitoring across the applications being run on the client computing devices, any combination thereof, and/or other criteria. In some examples, each individual set of criteria may be associated with a predetermined set of information to be monitored in extended mode responsive to the condition being met.

The first mode determination instructions 212, when executed by processor 210, may send to the requesting first client computing device 100 an indication to monitor in extended mode, along with the individual set of criteria that was met, the set of predetermined information associated with the set of criteria, and/or other information related to the set of criteria responsive to an individual set of criteria being met.

In another example, the first mode determination instructions 212, when executed by processor 210, may determine that the first monitoring mode comprises the regular mode based on the received monitoring information not meeting any predetermined set of criteria received from a customer.

In some examples, the first mode determination instructions 212, when executed by processor 210, may determine a monitoring mode based on bandwidth used by the client computing device 100. The amount of bandwidth used by the client computing device 100 may be added to an amount of bandwidth used by other client computing devices that run the first application and from which application flow is monitored to determine a total amount of bandwidth. In some examples, only the amount of bandwidth used to monitor applications in extended mode may be used to calculate the total amount of bandwidth used by other client computing devices.

Bandwidth may exist to monitor the application running on the client computing device 100 responsive to the total amount of bandwidth being less than a predetermined threshold amount. The predetermined threshold amount may be preset by the server computing device 200, by a system administrator, received from a customer, and/or otherwise determined. Other ways of determining whether bandwidth exists may also be used and are not limited to the examples described herein.

In these examples, the first mode determination instructions 212, when executed by processor 210, may compare the received monitoring information with the set of conditions, customer criteria, and/or other information based on which the application would be monitored in extended mode. Responsive to a determining that the application should be monitored in extended mode, the first mode determination instructions 212, when executed by processor 210, may determine whether bandwidth exists for the client computing device 100 to enter extended mode based on the amount of bandwidth that the client computing device would use to monitor in extended mode. For example, the first mode determination instructions 212, when executed by processor 210, may determine the specifications (e.g., characteristics) associated with the client computing device 100, may determine the information to be obtained during extended mode based on the information met, and may calculate an amount of bandwidth that may be used by the client computing device 100 to monitor in extended mode.

In these examples, responsive to the total amount of bandwidth used by all of the client computing devices monitoring the application and the calculated amount of bandwidth being less than the predetermined threshold, the first mode determination instructions 212, when executed by processor 210, may determine that bandwidth exists. Otherwise, the first mode determination instructions 212, when executed by processor 210, may determine that bandwidth does not exist.

In these examples, responsive to bandwidth existing, the first mode determination instructions 212, when executed by processor 210, may send an indication to the client computing device 100 to monitor the application in the determined extended mode.

In these examples, responsive to determining that bandwidth does not exist, the first mode determination instructions 212, when executed by processor 210, may determine whether the server can send an indication to another client computing device to end monitoring in extended mode. Responsive to determining that the server can send an indication to another client computing device to end monitoring in extended mode, the first mode determination instructions 212, when executed by processor 210, may send the end indication to the another client computing device. In some examples, the first mode determination instructions 212, when executed by processor 210, may make this determination based on an amount of time that the another client computing device has been monitoring the application in extended mode, a number of client computing devices monitoring the application in a same type of extended mode, and/or based on other factors related to monitoring the application.

In these examples, responsive to sending an indication to another client computing device to end extended mode monitoring, the first mode determination instructions 212, when executed by processor 210, may send an indication to the client computing device 100 to monitor the application in the determined extended mode.

In these examples, responsive to no condition, customer criteria, or other information being met based on which the application would be monitored in extended mode, the first mode determination instructions 212, when executed by processor 210, may determine whether bandwidth exists to monitor the application running on the client computing device 100 in extended mode. Responsive to bandwidth existing, the first mode determination instructions 212, when executed by processor 210, may randomly select a client computing device requesting a mode indication and send an indication to that randomly selected client computing device to monitor the application in extended mode. In some examples, the first mode determination instructions 212, when executed by processor 210, may also send information related to a set of conditions, customer criteria, and/or other information which may or may not have been met by the selected client computing device.

In some examples, the first mode determination instructions 212, when executed by processor 210, may determine a monitoring mode based on whether a predetermined number of client computing devices are monitoring applications in extended mode. For example, responsive to determining that less than the predetermined number of client computing devices are being monitored in extended mode, the first mode determination instructions 212, when executed by processor 210, may randomly select a client computing device (e.g., client computing device 100) and may send the client computing device an indication to monitor the application running thereon in extended mode.

In some examples, the first mode determination instructions 212, when executed by processor 210, may determine a monitoring mode based solely on random selection. For example, for each client computing device that requests a monitoring mode, the first mode determination instructions 212, when executed by processor 210, may randomly determine whether to send an indication to the requesting client computing device to monitor the application running thereon in extended mode or regular mode.

Second mode determination instructions 122, when executed by processor 210, may determine a second monitoring mode by which application flow for the first application on a second client computing device is monitored, wherein the second monitoring mode is one of the regular mode or the extended mode. The second mode determination instructions 122, when executed by processor 210, may determine the second monitoring mode in a manner the same as or similar to the determination of the first monitoring mode by the first mode determination instructions 121.

Figure 3:
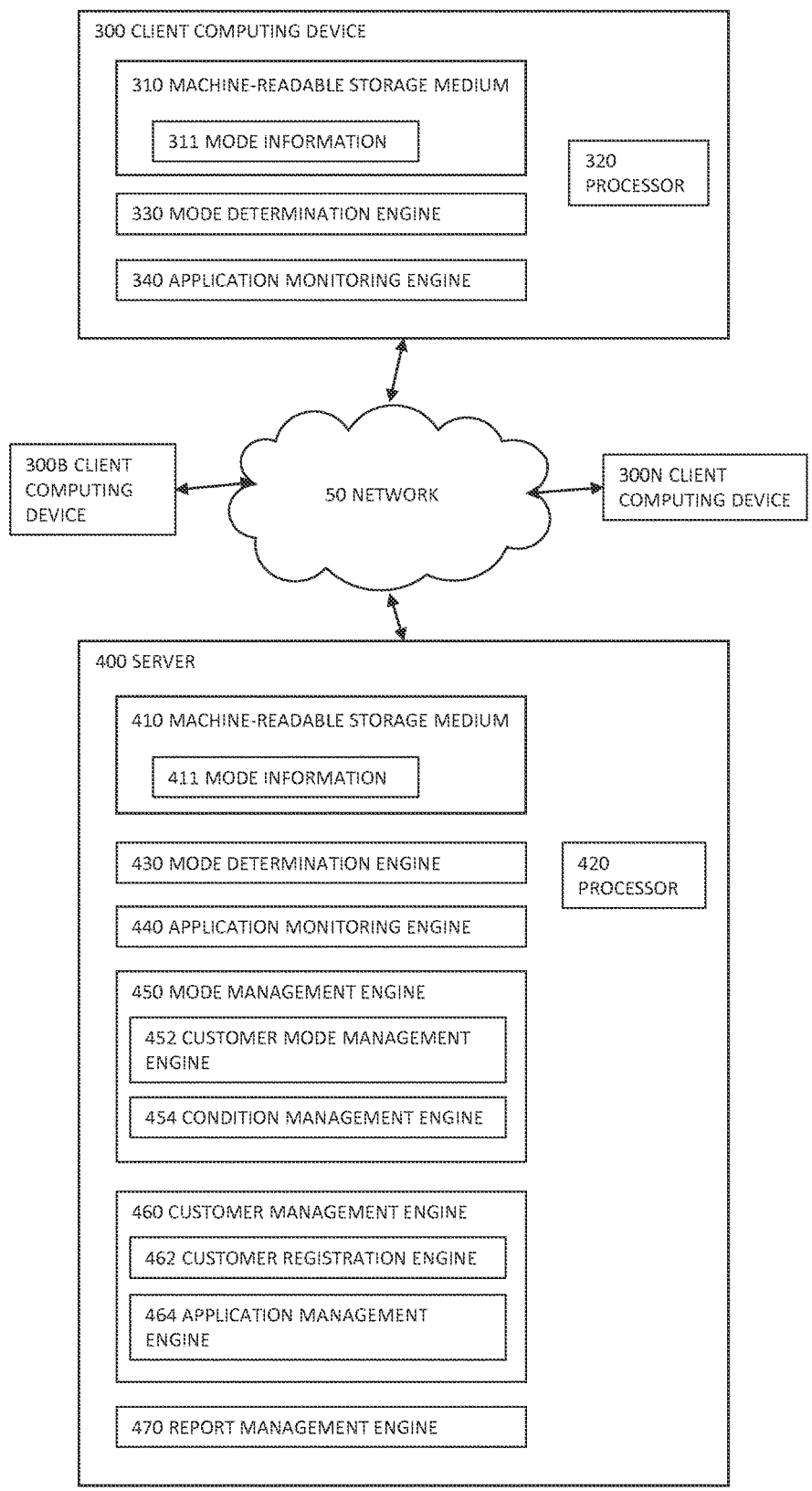
FIG. 3 is a block diagram of an example server computing device in communication with a plurality of client computing devices for monitoring applications running on the plurality of client computing devices.

FIG. 3 is a block diagram of an example server computing device 400 in communication with a plurality of client computing devices 300, 300B, . . . , 300N for determining user experience of an application running on the plurality of client computing devices. As with processor 120 of FIG. 1, processor 320 may be one or more CPUs, microprocessors, and/or other hardware devices suitable for retrieval and execution of instructions.

As illustrated in FIG. 3 and described below, server computing device 400 may communicate with client computing device 300. As illustrated, client computing device 300 may include a number of engines 330-340. Server computing device may include a number of engines 430-470. Each of the engines may include a series of instructions encoded on a machine-readable storage medium and executable by a processor of the client computing device 200. In addition or as an alternative, each engine may include one or more hardware devices including electronic circuitry for implementing the functionality described below.

As with client computing device 100 of FIG. 1, client computing device 300 may be a notebook, desktop, tablet, workstation, mobile device, or any other device suitable for executing the functionality described below. As detailed below, client 300 may include a series of engines 330-340 for determining user experience of an application. Each of the engines may generally represent any combination of hardware and programming. For example, each of the engines may include a series of program instructions encoded on a machine-readable storage medium and executable by a processor 320 of the client computing device 300. In addition or as an alternative, each engine may include one or more hardware devices including electronic circuitry for implementing the functionality described below.

Mode determination engine 330 may determine a mode by which to monitor application flow in the application. In some examples, the mode determination 330 may determine the mode by requesting a mode from the server computing device 400. Responsive to request the mode, the mode determination engine 330 may receive an indication of a monitoring mode from the server computing device 400. In some of these examples, the mode determination engine 330 may receive current mode information from the server computing device 400 and may determine the mode based on the received current mode information in a manner the same as or similar to that of the server computing device 400. Further details regarding an example implementation of mode determination engine 330 are provided above in connection with mode determination instructions 122 of FIG. 1.

Application monitoring engine 340 may monitor application flow in the application. Application monitoring engine 340 may monitor application flow of the application responsive to the mode determination engine 330 determining that a mode by which to monitor application flow. Further details regarding an example implementation of application monitoring engine 340 are provided above in connection with application monitoring instructions 123 of FIG. 1.

Figure 4A:
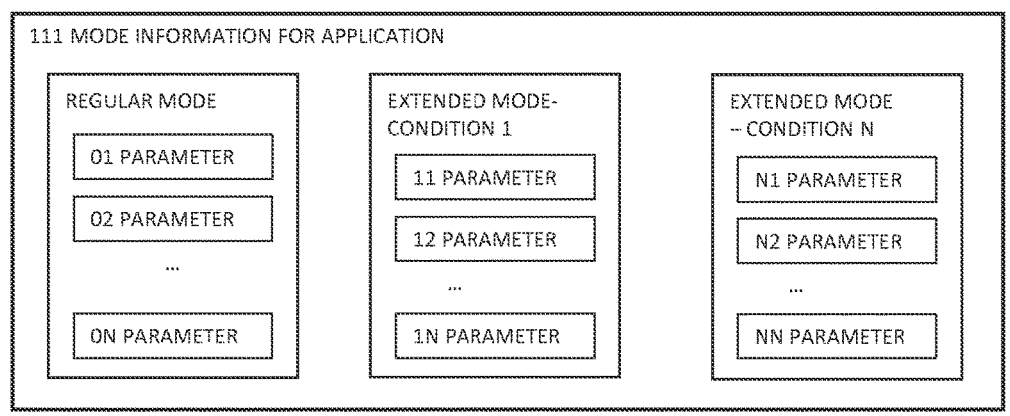
FIG. 4A is a an example depiction of mode information for an application that is stored on a client computing device.

FIG. 4A is an example depiction of mode information 111 for an application that is available on a client computing device 100. The mode information 111 may comprise, for example, the predetermined sets of information to be obtained when monitoring in regular mode and extended mode.

For regular mode, the mode nformation may comprise a set of values associated with a respective set of parameters. The predetermined set of information for regular mode may comprise other information as well, and is not limited to the examples described herein.

For extended mode, the mode information 111 may comprise a default predetermined set of information. In some examples, the mode information 111 may also comprise a plurality of predetermined sets of information related to the set of conditions, customer criteria, and/or other information based on which the application may be monitored in extended mode. For example, the mode information 111 may comprise a predetermined set of information for each condition of a set of conditions based on which an application may be monitored in extended mode. In another example, the mode information 111 may comprise a predetermined set of information for each set of criteria supplied by a customer. In another example, the mode information 111 may comprise the combined predetermined sets of information of the previous examples, and/or other information. The predetermined set of information for extended mode is not limited to the examples described herein.

As shown in the example depiction in FIG. 4A, mode information 111 may comprise a predetermined set of information for regular mode, and each condition of a set of conditions associated with extended mode, where the predetermined set of information comprises a set of parameters for which values may be obtained during monitoring.

Returning to FIG. 3, as with server computing device 200 of FIG. 1, server computing device 400 may be a cloud server, a mainframe, or any other device suitable for executing the functionality described below. As detailed below, server 400 may include a series of engines 430-470 for determining user experience of an application. As discussed above, each of the engines may generally represent any combination of hardware and programming. For example, each of the engines may include a series of program instructions encoded on a machine-readable storage medium and executable by a processor 420 of the server computing device 400. In addition or as an alternative, each engine may include one or more hardware devices including electronic circuitry for implementing the functionality described below.

Mode determination engine 430 may determine whether a user action was perceived in the application. Mode determination engine 430 may determine that a user action occurred in the application, may receive an indication that a user action occurred in the application, and/or may otherwise determine that a user action was perceived in the application. Further details regarding an example implementation of mode determination engine 430 are provided above in connection with first mode determination instructions 212 of FIG. 2.

Application monitoring engine 440 may receive information monitored by the client computing device 300. The application monitoring engine 440 may store the received monitored locally at the machine-readable storage medium 410.

The application monitoring engine 440 may compare the information obtained during monitoring with the set of conditions, customer criteria, and/or other information based on which the application may be monitored in extended mode. Responsive to determining that the application may be monitored in extended mode, the application monitoring engine 440 may send an indication to the client computing device 300 to monitor the application in extended mode, may send current mode information to the client computing device 300, and/or may otherwise attempt to monitor the application in extended mode.

Mode management engine 450 may manage the modes by which application flow is monitored. The mode management engine 450 may maintain mode information for the modes by which application flow is monitored. For example, the mode management engine 450 may maintain a set of conditions whereby an application is monitored in extended mode responsive to an individual condition being met. In some examples, the mode management engine 450 may determine new conditions based on received application monitoring information from client computing devices. The mode management engine 450 may also update mode information with new conditions for extended mode based on the determined new conditions.

In some examples, the mode management engine 450 may aggregate the stored monitoring information received from the client computing devices running the application and monitoring application flow thereon. The mode management engine 450 may determine new conditions based on the aggregated data, may remove or make inactive existing conditions based on the aggregated data, and/or may otherwise manage information related to the modes by which the application is monitored.

In some examples, and as depicted in FIG. 3, mode management engine 450 may comprise a set of engines, including, for example, customer management engine 452, condition management engine 454, and/or other engines to manage the monitoring modes by which applications are monitored.

Customer mode management engine 452 may receive a new condition to include in the set of conditions from a customer associated with the application. As discussed above, a customer may be an application developer, application owner, entity delineated by an application owner, and/or other third party with an interest in the application.

Condition management engine 454 may determine a new condition to include in the set of conditions based on the received monitoring information from the client computing devices running the application and monitoring application flow. The condition management engine 454 may compare received monitoring information for an application from the client computing device 100 with stored monitoring information received from the client computing devices running the application.

Responsive to a difference between a set of parameters of the received monitoring information and the saved information exceeding a predetermined threshold, the condition management engine 454 may determine whether a condition exists to monitor that set of parameters.

Responsive to determining that no condition exists, the condition management engine 454 may create a new condition. The condition management engine 454 may determine an environment in which the received monitoring information was received. The condition management engine 454 may then determine whether to create a new condition. For example, the condition management engine 454 may determine whether a pattern exists amount multiple client computing devices such that the determined difference exists in received monitored information from an amount of client computing devices exceeding a predetermined threshold amount of devices, from a number of client computing devices in a predetermined time period that exceeds a threshold ratio with the time period, and/or based on other patterns being determined.

Responsive to determining that no condition exists, the condition management engine 454 may create the new condition. The condition management engine 454 may create the new condition by determining a set of parameters to monitor to determine whether the condition is met, information to be obtained when monitoring in extended mode based on the new condition being met, characteristics of client computing devices necessary to meet the condition, characteristics of the application running on the client computing device necessary to meet the condition, and/or by creating the new condition in other manners.

For example, the condition management engine 454 may compare network connectivity included in the received monitoring information with the saved information and determine whether a difference between the respective values thereof exceed a predetermined threshold. Responsive to the values exceeding a threshold, the condition management engine 454 may determine that a new condition related to network connectivity should be created. In some examples, the condition management engine 454 may also determine an end condition associated with the new condition, such that client computing devices would end monitoring in extended mode due to the new network connectivity condition responsive to network connectivity exceeding a predetermined value.

Responsive to determining that a condition exists, the condition management engine 454 may not take any action.

Customer management engine 460 may manage customers associated with an application. As mentioned above, a customer may comprise an application owner, an application developer, an entity delineated by an application owner, and/or other third party with an interest in the application.

In some examples, and as depicted in FIG. 3, customer management engine 460 may comprise a set of engines, including, for example, customer registration engine 462, application management engine 464, and/or other engines to handle customer interaction with the application.

Customer registration engine 462 may obtain customer registration information for a customer. The customer registration engine 462 may obtain information about the customer, information related to applications that the customer would like to be monitored, information related to reports that the customer would like prepared, information related to analysis and/or statistics to be prepared for an individual application or across multiple applications, and/or other information related to a customer.

The application management engine 464 may obtain information about the application, the modes by which the application may be monitored, mode information related to the mode, a set of conditions based on which the application may be monitored in a particular mode, customer criteria based on which the application may be monitored in a particular mode, and/or other information related to the application. Customer criteria may comprise differences in monitoring based on different characteristics of client computing devices on which the application is monitored, a set of thresholds related to bandwidth associated with monitoring applications, and/or other information related to monitoring the application. The application management engine 464 may store this information in association with the application, may include a portion of this information with mode information associated with the application, and/or may otherwise handle this information. In some examples, the application management engine 464 may obtain updates for some or all of this information during monitoring of an application. For example, the application management engine 464 may obtain new conditions for the set of conditions based on which the application may be monitored in extended mode.

Report management engine 470 may prepare reports to customers based on aggregated data related to an application, customer-specific data, and/or other information requested by and/or associated with the customer. For example, the report management engine 470 may prepare reports in conjunction with customer requests and/or based on other determinations.

The report management engine 470 may also determine statistics and perform analysis on the aggregated data. For example, the report management engine 470 may determine statistics and/or perform analysis in conjunction with customer requests, and/or based on other determinations.

In some examples, the report management engine 470 may prepare reports, perform analysis, and/or otherwise handle the information collected by the system responsive to a customer request, at predetermined time intervals, responsive to predetermined conditions being met, and/or based on other determinations.

Figure 4B:
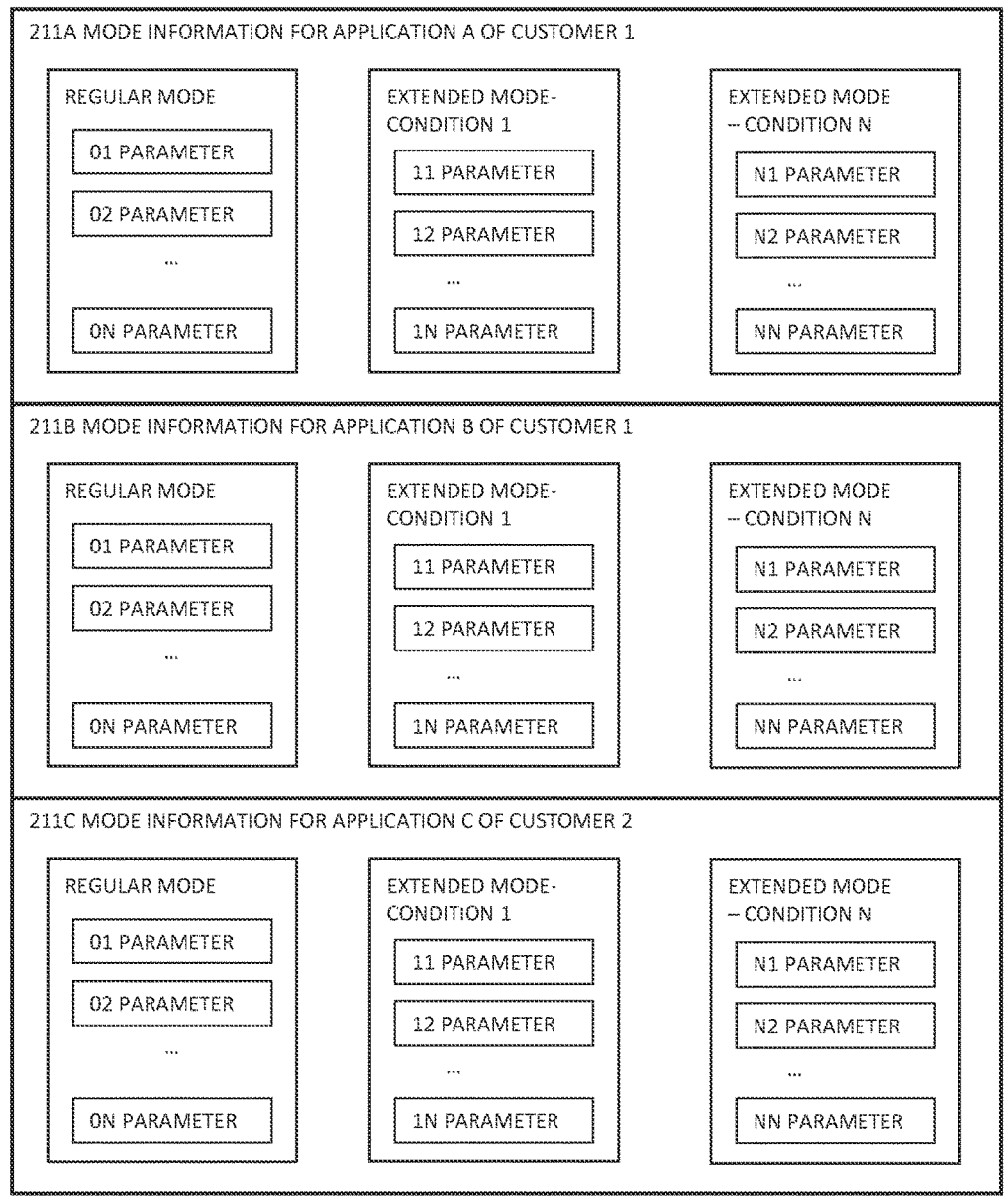
FIG. 4B is a an example depiction of mode information for applications available on a plurality of client computing devices that is stored on a server computing device.

FIG. 4B is an example depiction of mode information 211 for an application, where the mode information 211 may be stored at server computing device 200. The mode information 211 may comprise, for each application which may be monitored by server computing device 200, information that is the same as or similar to the mode information 111.

As shown in the example depiction in FIG. 4B, mode information 211 may comprise, for each application monitored by server computing device 200, a predetermined set of information for regular mode, and each condition of a set of conditions associated with extended mode, where the predetermined set of information comprises a set of parameters for which values may be obtained during monitoring.

Figure 5:
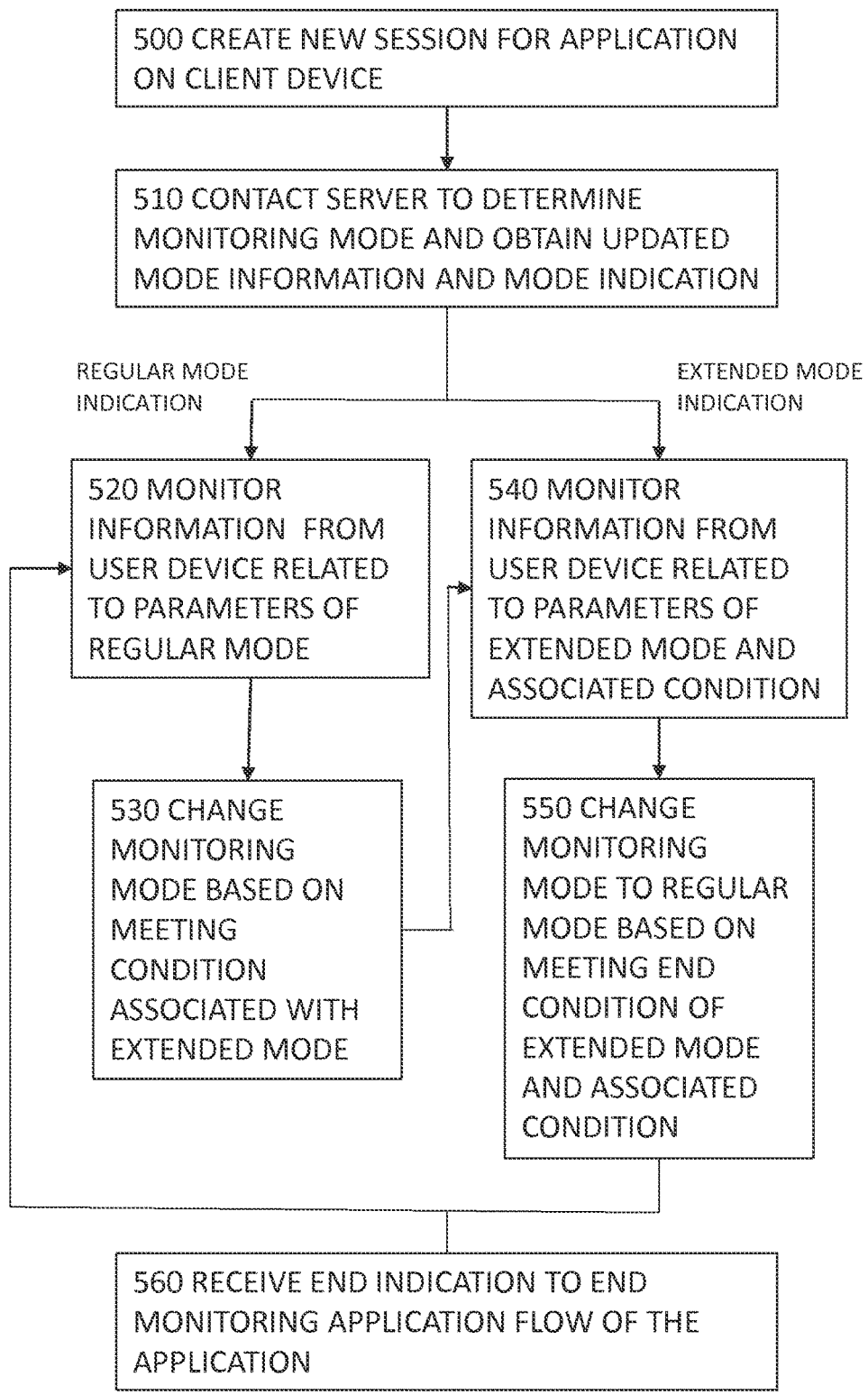
FIG. 5 is a flowchart of an example method for execution by a client computing device for monitoring applications running on the client device.

FIG. 5 is a flowchart of an example method for execution by a client computing device for monitoring applications running on the client device.

Although execution of the method described below is with reference to client computing device 100 of FIG. 1 and/or client computing device 300 of FIG. 3, other suitable devices for execution of this method will be apparent to those of skill in the art, such as server computing device 400 of FIG. 3 The method described in FIG. 5 and other figures may be implemented in the form of executable instructions stored on a machine-readable storage medium, such as storage medium 120, by one or more engines described herein, and/or in the form of electronic circuitry.

In an operation 500, a new session for the application being monitored is created. For example, the client computing device 100 may create a new session for the application being monitored.

In an operation 510, the server may be contacted to determine a monitoring mode by which application flow is monitored, and updated mode information and a mode indication may be obtained from the server. For example, the client computing device 100 (and/or the mode determination instructions 122, the mode determination engine 320, or other resource of the client computing device 100) may contact the server. The client computing device 100 may contact the server in a manner similar or the same as that described above in relation to the execution of the mode determination instructions 122, the mode determination engine 320, and/or other resource of the client computing device 100.

In an operation 520, responsive to receiving a mode indication of regular mode, information from the application may be monitored based on the parameters associated with regular mode. For example, the client computing device 100 (and/or the application monitoring instructions 123, the application monitoring engine 330, or other resource of the client computing device 100) may monitor the application in regular mode. The client computing device 100 may monitor the application in a manner similar or the same as that described above in relation to the execution of the application monitoring instructions 123, the application monitoring engine 330, and/or other resource of the client computing device 100.

In an operation 530, the monitoring mode by which application flow of the application is monitored may be changed responsive to a condition associated with extended mode being met. For example, the client computing device 100 (and/or the mode determination instructions 122, application monitoring instructions 123, the mode determination engine 320, the application monitoring engine 330, or other resource of the client computing device 100) may change the monitoring mode. The client computing device 100 may change the monitoring mode in a manner similar or the same as that described above in relation to the execution of the mode determination instructions 122, application monitoring instructions 123, the mode determination engine 320, the application monitoring engine 330, and/or other resource of the client computing device 100.

In an operation 540, responsive to the mode indication indicating extended mode and comprising an associated condition, the client computing device 100 may monitor information related to the application based on the parameters related to extended mode and the associated condition. For example, the client computing device 100 (and/or the application monitoring instructions 123, the application monitoring engine 330, or other resource of the client computing device 100) may monitor the application in extended mode. The client computing device 100 may monitor the application in a manner similar or the same as that described above in relation to the execution of the application monitoring instructions 123, the application monitoring engine 330, and/or other resource of the client computing device 100.

In an operation 540, responsive to meeting an end condition associated with extended mode and the associated condition, the monitoring mode may be changed to regular mode. For example, the client computing device 100 (and/or the application monitoring instructions 123, the application monitoring engine 330, or other resource of the client computing device 100) may monitor the application in regular mode responsive to such a determination. The client computing device 100 may monitor the application in a manner similar or the same as that described above in relation to the execution of the application monitoring instructions 123, the application monitoring engine 230, and/or other resource of the client computing device 100.

In an operation 560, the client computing device 100 may receive an indication to end monitoring of the application. For example, the client computing device 100 (and/or the application monitoring instructions 123, the application monitoring engine 330, or other resource of the client computing device 100) may receive the indication to end monitoring. The client computing device 100 may receive the indication to end monitoring in a manner similar or the same as that described above in relation to the execution of the application monitoring instructions 123, the application monitoring engine 330, and/or other resource of the client computing device 100.

Figure 6:
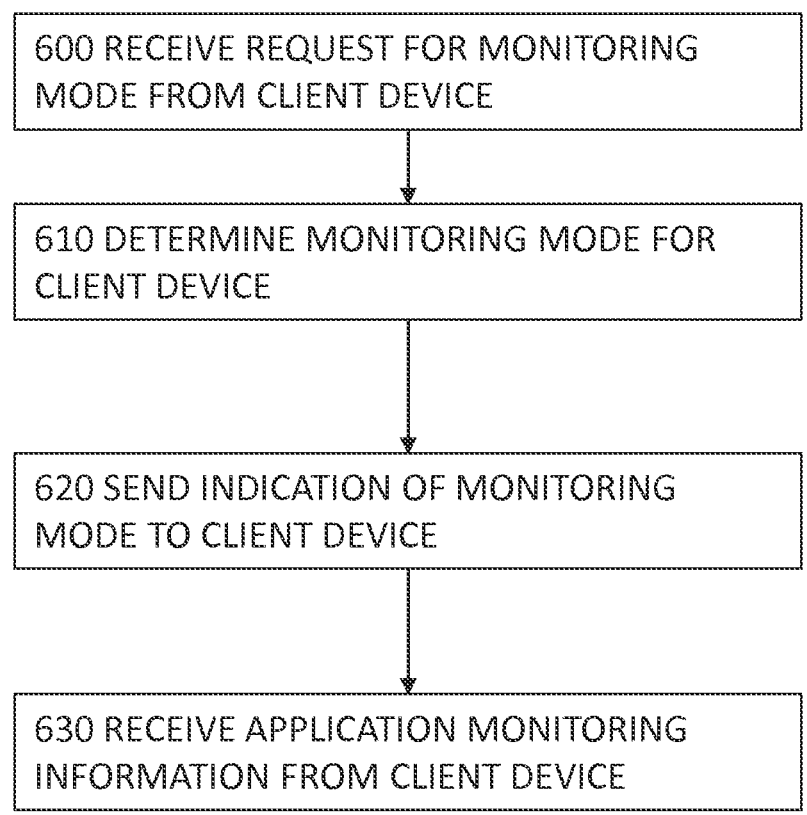
FIG. 6 is a flowchart of an example method for execution by a server computing device for monitoring applications running on a client computing device.

FIG. 6 is a flowchart of an example method for execution by a server computing device for monitoring applications running on a client computing device.

In an operation 600, the server computing device 200 may receive a request for a monitoring mode from a client computing device 100. For example, the server computing device 400 (and/or the first mode determination instructions 211, the mode determination engine 430, or other resource of the server computing device 200) may receive the request. The server computing device 200 may receive the request in a manner similar or the same as that described above in relation to the execution of the first mode determination instructions 211, the mode determination engine 430, and/or other resource of the server computing device 200.

In an operation 610, the server computing device 200 may determine a monitoring mode by which application flow is monitored for the requesting client computing device. For example, the server computing device 400 (and/or the first mode determination instructions 211, the mode determination engine 430, or other resource of the server computing device 200) may determine the monitoring mode. The server computing device 200 may determine the monitoring mode in a manner similar or the same as that described above in relation to the execution of the first mode determination instructions 211, the mode determination engine 430, and/or other resource of the server computing device 200.

In an operation 620, the server computing device 200 may send an indication of the determined monitoring mode to the requesting client computing device. For example, the server computing device 400 (and/or the first mode determination instructions 211, the mode determination engine 430, or other resource of the server computing device 200) may send the indication. The server computing device 200 may send the indication in a manner similar or the same as that described above in relation to the execution of the first mode determination instructions 211, the mode determination engine 430, and/or other resource of the server computing device 200.

In an operation 630, the server computing device 200 may receive application monitoring information from the client computing device which requested the monitoring mode. For example, the server computing device 400 (and/or the application monitoring engine 440, or other resource of the server computing device 200) may receive the application monitoring information. The server computing device 200 may receive the application monitoring information in a manner similar or the same as that described above in relation to the execution of the application monitoring engine 440, and/or other resource of the server computing device 200.

Figure 7:
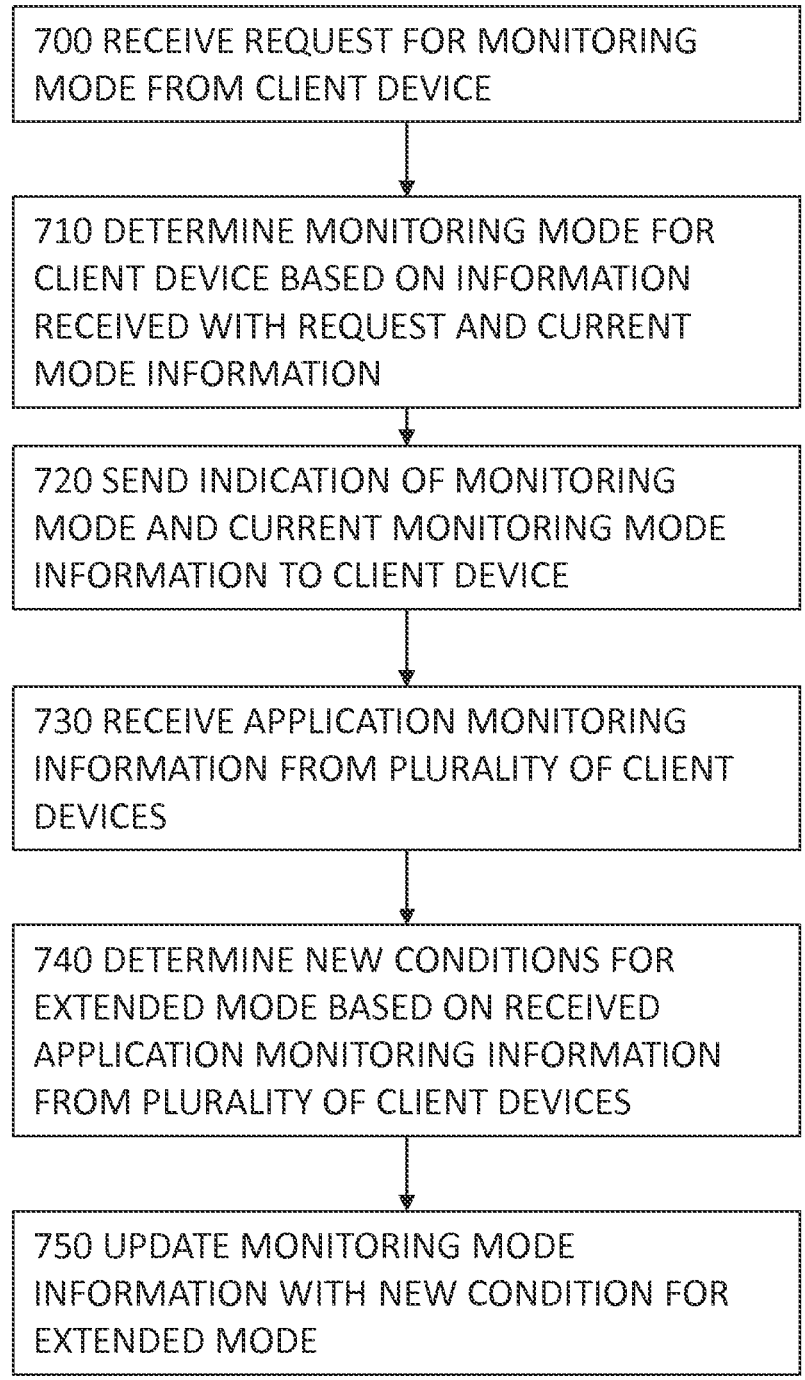
FIG. 7 is a flowchart of an example method for execution by a server computing device for monitoring applications running on a client computing device.

FIG. 7 is a flowchart of an example method for execution by a server computing device for monitoring applications running on a client computing device.

In an operation 700, the server computing device 200 may receive a request for a monitoring mode from a client computing device 100. The request may comprise application flow information for the application, and/or other information related to the application and the requesting client computing device. For example, the server computing device 400 (and/or the first mode determination instructions 211, the mode determination engine 430, or other resource of the server computing device 200) may receive the request. The server computing device 200 may receive the request in a manner similar or the same as that described above in relation to the execution of the first mode determination instructions 211, the mode determination engine 430, and/or other resource of the server computing device 200.

In an operation 710, the server computing device 200 may determine a monitoring mode by which application flow is monitored for the requesting client computing device based on information received with the request and current mode information. For example, the server computing device 400 (and/or the first mode determination instructions 211, the mode determination engine 430, or other resource of the server computing device 200) may determine the monitoring mode. The server computing device 200 may determine the monitoring mode in a manner similar or the same as that described above in relation to the execution of the first mode determination instructions 211, the mode determination engine 430, and/or other resource of the server computing device 200.

Figure 7A:
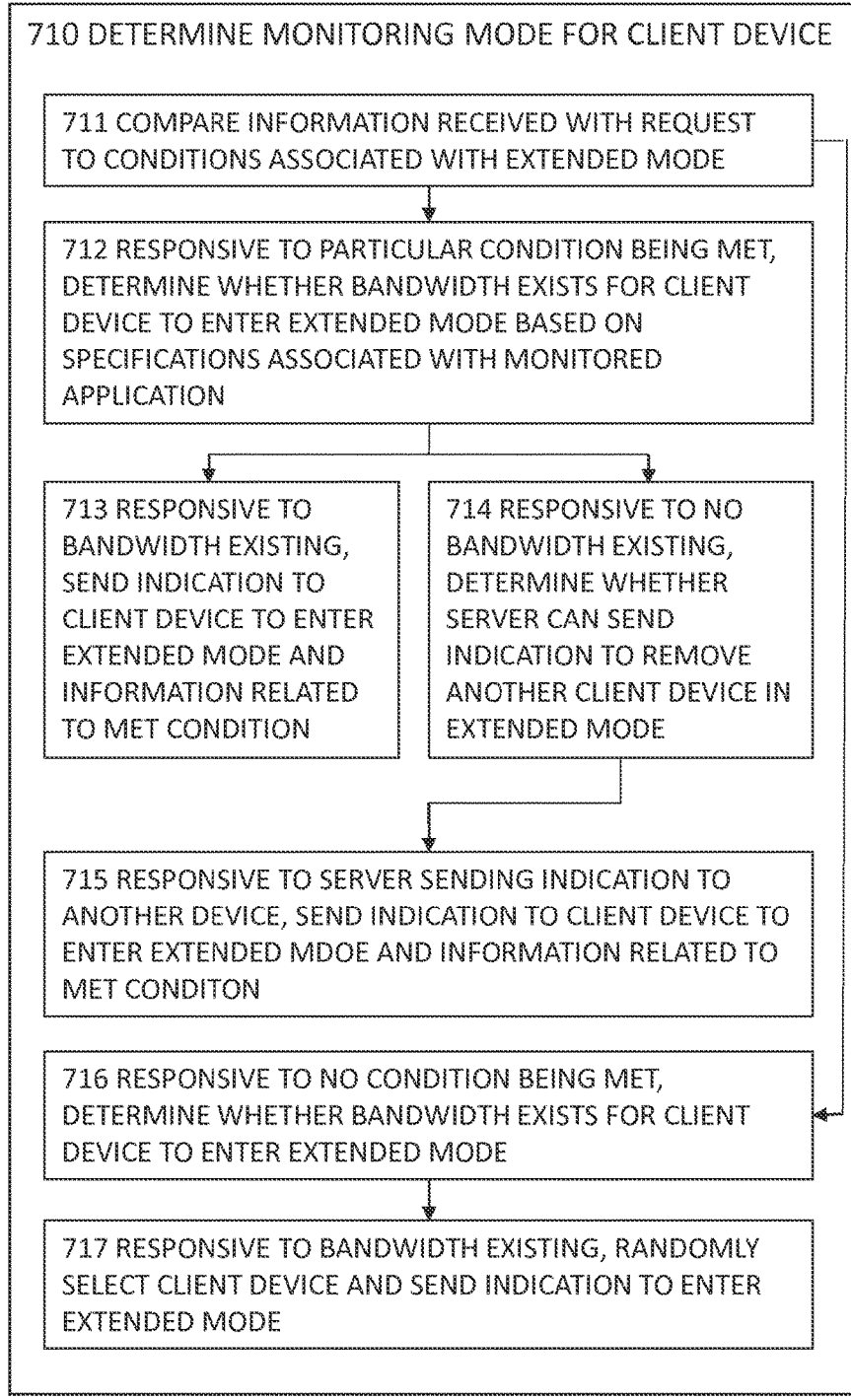
FIG. 7A is a flowchart of an example method for execution by a server computing device for determining a monitoring mode for an application running on a client computing device.
Figure 7B:
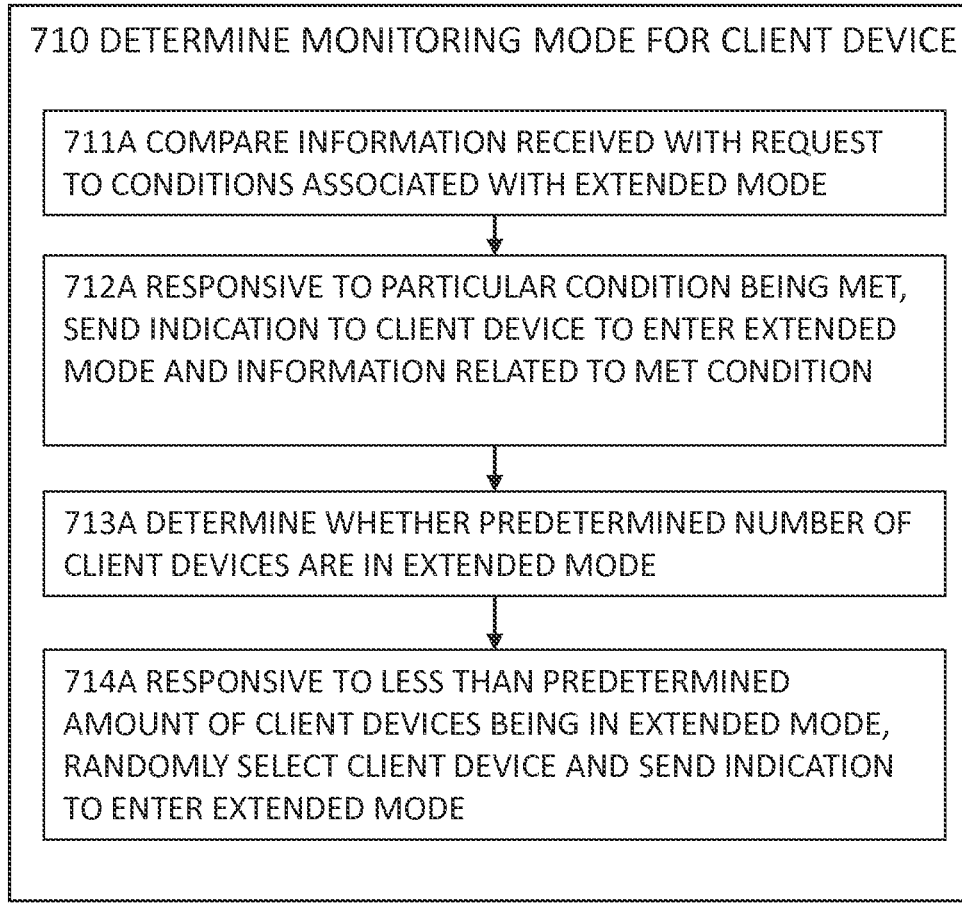
FIG. 7B is a flowchart of an example method for execution by a server computing device for determining a monitoring mode for an application running on a client computing device.
Figure 7C:
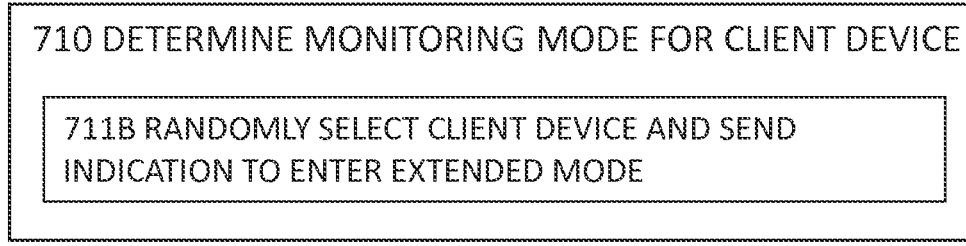
FIG. 7C is a flowchart of an example method for execution by a server computing device for determining a monitoring mode for an application running on a client computing device.

For example, the server computing device 200 may determine the monitoring mode for the requested client computing device in a variety of ways. FIGS. 7A, 7B, and 7C are flowcharts of example methods by which the server computing device may determine a monitoring mode. The server computing device 200 may use one, several, all, or any combination of the methods described herein. The manner in which the server computing device 200 determines the monitoring mode is not limited to the examples described herein.

As described above, FIG. 7A is a flowchart of an example method for execution by a server computing device for determining a monitoring mode for an application running on a client computing device.

In an operation 711, the server computing device 200 may compare the information received with the request from the client computing device to conditions associated with extended mode. For example, the server computing device 400 (and/or the first mode determination instructions 211, the mode determination engine 430, or other resource of the server computing device 200) may compare the information. The server computing device 200 may compare the information in a manner similar or the same as that described above in relation to the execution of the first mode determination instructions 211, the mode determination engine 430, and/or other resource of the server computing device 200.

In an operation 712, the server computing device 200 may determine whether bandwidth exists for the client computing device to enter extended mode based on specifications associated with the application and responsive to a particular condition associated with extended mode being met. For example, the server computing device 400 (and/or the first mode determination instructions 211, the mode determination engine 430, or other resource of the server computing device 200) may determine whether bandwidth exists. The server computing device 200 may determine whether bandwidth exists in a manner similar or the same as that described above in relation to the execution of the first mode determination instructions 211, the mode determination engine 430, and/or other resource of the server computing device 200.

In an operation 713, the server computing device 200 may send an indication to the client computing device to enter extended mode and information related to the condition that was met responsive to determining that bandwidth exists. For example, the server computing device 400 (and/or the first mode determination instructions 211, the mode determination engine 430, or other resource of the server computing device 200) may send the indication and information related to the condition. The server computing device 200 may send the indication and information related to the condition in a manner similar or the same as that described above in relation to the execution of the first mode determination instructions 211, the mode determination engine 430, and/or other resource of the server computing device 200.

In an operation 714, the server computing device 200 may determine whether to send an indication to another client computing device to remove that other client computing device responsive to no bandwidth existing. For example, the server computing device 400 (and/or the first mode determination instructions 211, the mode determination engine 430, or other resource of the server computing device 200) may determine whether to send a removal indication. The server computing device 200 may determine whether to send a removal indication in a manner similar or the same as that described above in relation to the execution of the first mode determination instructions 211, the mode determination engine 430, and/or other resource of the server computing device 200.

In an operation 715, the server computing device 200 may send an indication to the requesting client computing device to enter extended mode as well as information related to the condition being met, responsive to sending a removal indication to the other client computing device. For example, the server computing device 400 (and/or the first mode determination instructions 211, the mode determination engine 430, or other resource of the server computing device 200) may send the indication and information related to the condition. The server computing device 200 may send the indication and information related to the condition in a manner similar or the same as that described above in relation to the execution of the first mode determination instructions 211, the mode determination engine 430, and/or other resource of the server computing device 200.

In an operation 716, the server computing device 200 may determine whether bandwidth exists for the client computing device to enter extended mode responsive to no condition being met. For example, the server computing device 400 (and/or the first mode determination instructions 211, the mode determination engine 430, or other resource of the server computing device 200) may determine whether bandwidth exists. The server computing device 200 may determine whether bandwidth exists in a manner similar or the same as that described above in relation to the execution of the first mode determination instructions 211, the mode determination engine 430, and/or other resource of the server computing device 200.

In an operation 717, the server computing device 200 may randomly select a client computing device and send an indication to that client computing device to enter extended mode responsive to bandwidth existing. For example, the server computing device 400 (and/or the first mode determination instructions 211, the mode determination engine 430, or other resource of the server computing device 200) may randomly select the client computing device and send the indication. The server computing device 200 may randomly select the client computing device and send the indication in a manner similar or the same as that described above in relation to the execution of the first mode determination instructions 211, the mode determination engine 430, and/or other resource of the server computing device 200.

As described above, FIG. 7B is a flowchart of another example method for execution by a server computing device for determining a monitoring mode for an application running on a client computing device.

In an operation 711A, the server computing device 200 may compare the information received with the request from the client computing device to conditions associated with extended mode. For example, the server computing device 400 (and/or the first mode determination instructions 211, the mode determination engine 430, or other resource of the server computing device 200) may compare the information. The server computing device 200 may compare the information in a manner similar or the same as that described above in relation to the execution of the first mode determination instructions 211, the mode determination engine 430, and/or other resource of the server computing device 200.

In an operation 712A, the server computing device 200 may determine whether bandwidth exists for the client computing device to enter extended mode based on specifications associated with the application and responsive to a particular condition associated with extended mode being met. For example, the server computing device 400 (and/or the first mode determination instructions 211, the mode determination engine 430, or other resource of the server computing device 200) may determine whether bandwidth exists. The server computing device 200 may determine whether bandwidth exists in a manner similar or the same as that described above in relation to the execution of the first mode determination instructions 211, the mode determination engine 430, and/or other resource of the server computing device 200.

In an operation 713A, the server computing device 200 may determine whether a predetermined amount of client computing devices are in extended mode. For example, the server computing device 400 (and/or the first mode determination instructions 211, the mode determination engine 430, or other resource of the server computing device 200) may determine whether a predetermined number of client computing devices are in extended mode. The server computing device 200 may determine whether a predetermined number of client computing devices are in extended mode in a manner similar or the same as that described above in relation to the execution of the first mode determination instructions 211, the mode determination engine 430, and/or other resource of the server computing device 200.

In an operation 714A, the server computing device 200 may randomly select a client computing device and send an indication to that client computing device to enter extended mode responsive to determining that less than a predetermined amount of client computing devices are in extended mode. For example, the server computing device 400 (and/or the first mode determination instructions 211, the mode determination engine 430, or other resource of the server computing device 200) may randomly select the client computing device and send the indication. The server computing device 200 may randomly select the client computing device and send the indication in a manner similar or the same as that described above in relation to the execution of the first mode determination instructions 211, the mode determination engine 430, and/or other resource of the server computing device 200.

As described above, FIG. 7C is a flowchart of yet another example method for execution by a server computing device for determining a monitoring mode for an application running on a client computing device.

In an operation 711B, the server computing device 200 may randomly select the client computing device and send an indication to that client computing device to enter extended mode. In some examples, the server computing device 200 may sua sponte select the client computing device. In some examples, the server computing device 200 may make the determination responsive to receiving a request for a mode indication from the client computing device. The server computing device 400 (and/or the first mode determination instructions 211, the mode determination engine 430, or other resource of the server computing device 200) may randomly determine that the client computing device should be in extended mode. The server computing device 200 may randomly determine that the client computing device should be in extended mode in a manner similar or the same as that described above in relation to the execution of the first mode determination instructions 211, the mode determination engine 430, and/or other resource of the server computing device 200.

Returning to FIG. 7, in an operation 720, the server computing device 200 may send an indication of the determined monitoring mode and current mode information to the requesting client computing device. For example, the server computing device 400 (and/or the first mode determination instructions 211, the mode determination engine 430, or other resource of the server computing device 200) may send the indication and current mode information. The server computing device 200 may send the indication and current mode information in a manner similar or the same as that described above in relation to the execution of the first mode determination instructions 211, the mode determination engine 430, and/or other resource of the server computing device 200.

In an operation 730, the server computing device 200 may receive application monitoring information from the client computing device which requested the monitoring mode as well as other client computing devices communicably coupled to the server computing device 200 which also run the application. For example, the server computing device 400 (and/or the application monitoring engine 440, or other resource of the server computing device 200) may receive the application monitoring information from a plurality of client computing devices. The server computing device 200 may receive application monitoring information from a plurality of client computing devices in a manner similar or the same as that described above in relation to the execution of the application monitoring engine 440, and/or other resource of the server computing device 200.

In an operation 740, the server computing device 200 may determine new conditions for extended mode based on received application monitoring information from the plurality of client computing devices. For example, the server computing device 400 (and/or the mode management engine 450, or other resource of the server computing device 200) may determine new conditions. The server computing device 200 may determine new conditions in a manner similar or the same as that described above in relation to the execution of the mode management engine 450, and/or other resource of the server computing device 200.

Figure 7D:
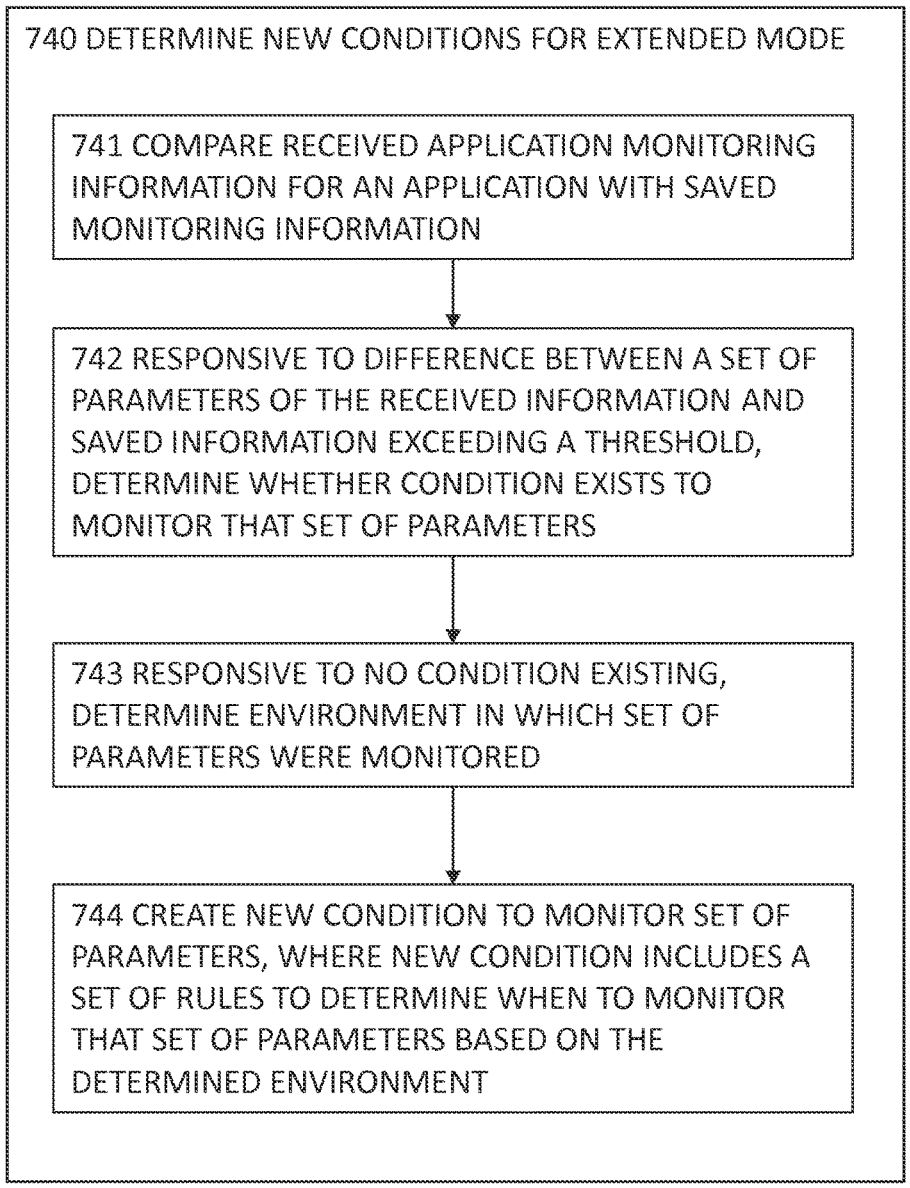
FIG. 7D is a flowchart of an example method for execution by a server computing device for determining new conditions for extended mode for an application running on a client computing device.
Figure 7E:
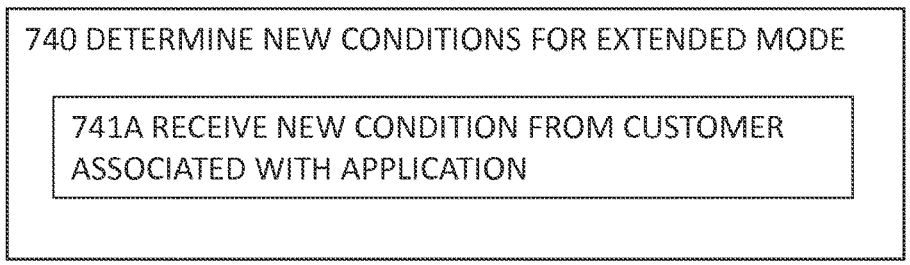
FIG. 7E is a flowchart of an example method for execution by a server computing device for determining new conditions for extended mode for an application running on a client computing device.

For example, the server computing device 200 may determine new conditions for extended in a variety of ways. FIGS. 7D and 7E are flowcharts of example methods by which the server computing device may determine new conditions for extended mode. The server computing device 200 may use one, several, all, or any combination of the methods described herein. The manner in which the server computing device 200 determines new conditions for extended mode is not limited to the examples described herein.

As described above, FIG. 7D is a flowchart of an example method for execution by a server computing device for determining new conditions for extended mode for an application running on a client computing device.

In an operation 741, the server computing device 200 may compare received application monitoring information for an application with saved monitoring information. For example, the server computing device 400 (and/or the mode management engine 450, or other resource of the server computing device 200) may compare the information. The server computing device 200 may compare the information in a manner similar or the same as that described above in relation to the execution of the mode management engine 450, and/or other resource of the server computing device 200.

In an operation 742, the server computing device 200 may determine whether a condition exists to monitor a set of parameters responsive to a different between that set of parameters of the received information and the saved information exceeding a threshold. For example, the server computing device 400 (and/or the mode management engine 450, or other resource of the server computing device 200) may determine whether a condition exists. The server computing device 200 may determine whether a condition exists in a manner similar or the same as that described above in relation to the execution of the mode management engine 450, and/or other resource of the server computing device 200.

In an operation 743, the server computing device 200 may determine an environment in which the set of parameters were monitored responsive to a condition existing. For example, the server computing device 400 (and/or the mode management engine 450, or other resource of the server computing device 200) may monitor the environment. The server computing device 200 may monitor the environment in a manner similar or the same as that described above in relation to the execution of the mode management engine 450, and/or other resource of the server computing device 200.

In an operation 744, the server computing device 200 may create a new condition to monitor the set of parameters, where the new condition comprises a set of rules to determine when to monitor that set of parameters based on the determined environment. For example, the server computing device 400 (and/or the mode management engine 450, or other resource of the server computing device 200) may create the new condition. The server computing device 200 may create the new condition in a manner similar or the same as that described above in relation to the execution of the mode management engine 450, and/or other resource of the server computing device 200.

As described above, FIG. 7D is a flowchart of an example method for execution by a server computing device for determining new conditions for extended mode for an application running on a client computing device.

In an operation 741A, the server computing device 200 may receive a new condition from a customer associated with the application. For example, the server computing device 400 (and/or the mode management engine 450, the customer management engine 460, or other resource of the server computing device 200) may receive a new condition from the customer. The server computing device 200 may receive a new condition from the customer in a manner similar or the same as that described above in relation to the execution of the mode management engine 450, the customer management engine 460, and/or other resource of the server computing device 200.

Returning to FIG. 7, in an operation 750, the server computing device 200 may update the mode information with the new conditions for extended mode. For example, the server computing device 400 (and/or the mode management engine 450, or other resource of the server computing device 200) may update the mode information. The server computing device 200 may update the mode information in a manner similar or the same as that described above in relation to the execution of the mode management engine 450, and/or other resource of the server computing device 200.

Figure 8:
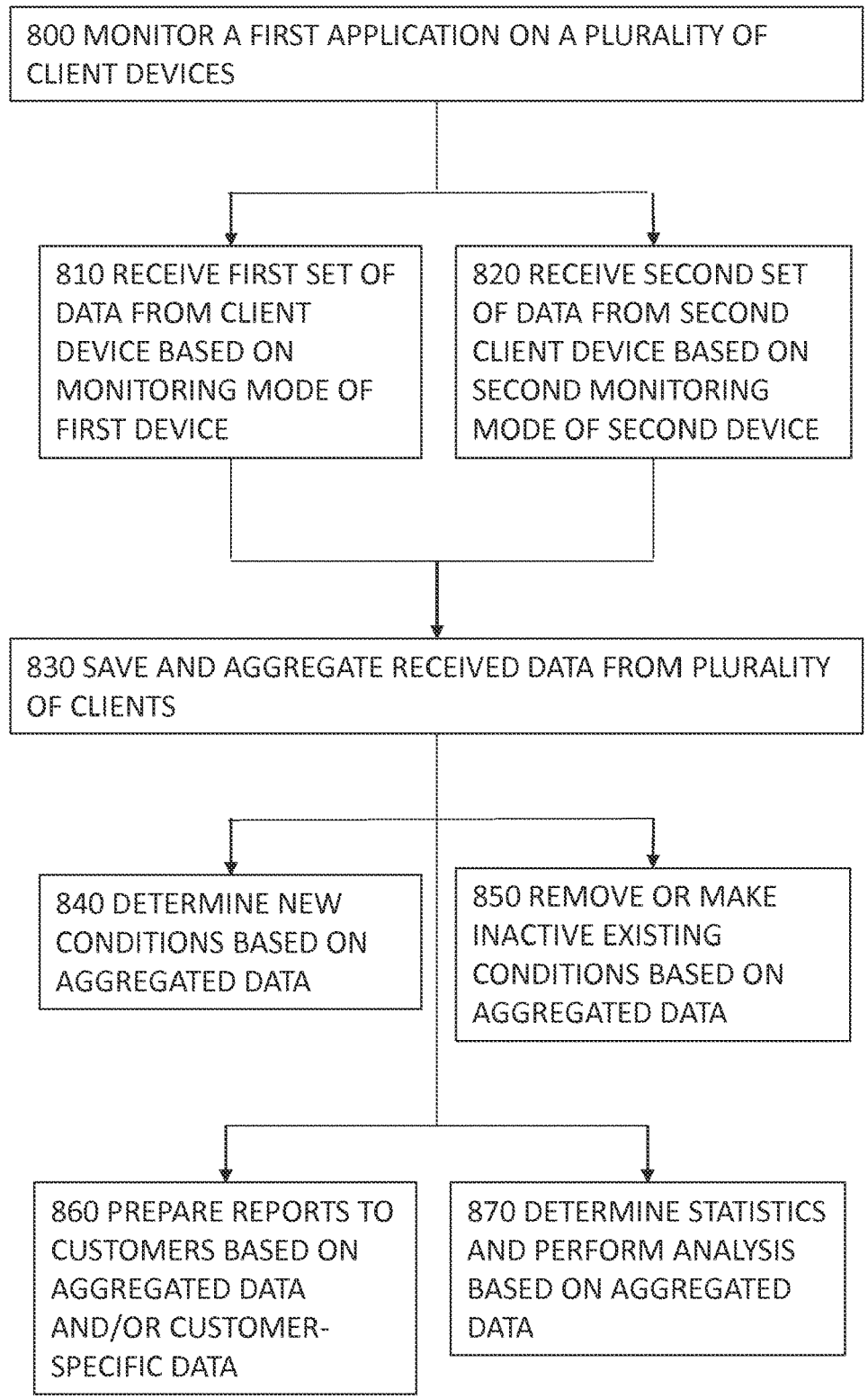
FIG. 8 is a flowchart of an example method for execution by a server computing device for monitoring applications running on a client computing device.

FIG. 8 is a flowchart of an example method for execution by a server computing device for monitoring applications running on a client computing device.

In an operation 800, the server computing device 200 may monitor a first application on a plurality of client computing devices. For example, the server computing device 400 (and/or the application monitoring engine 440, or other resource of the server computing device 200) may monitor the first application. The server computing device 200 may monitor the first application in a manner similar or the same as that described above in relation to the execution of the application monitoring engine 440, and/or other resource of the server computing device 200.

In an operation 810, the server computing device 200 may receive a first set of data from a first client computing device based on the monitoring mode of the first client computing device. For example, the server computing device 400 (and/or the application monitoring engine 440, or other resource of the server computing device 200) may receive the first set of data. The server computing device 200 may receive the first set of data in a manner similar or the same as that described above in relation to the execution of the application monitoring engine 440, and/or other resource of the server computing device 200.

In an operation 820, the server computing device 200 may receive a second set of data from a second client computing device based on the monitoring mode of the second client computing device. For example, the server computing device 400 (and/or the application monitoring engine 440, or other resource of the server computing device 200) may receive the second set of data. The server computing device 200 may receive the second set of data in a manner similar or the same as that described above in relation to the execution of the application monitoring engine 440, and/or other resource of the server computing device 200.

In an operation 830, the server computing device 200 may save and aggregate the received data from the plurality of clients. For example, the server computing device 400 (and/or the application monitoring engine 440, mode management engine 450, or other resource of the server computing device 200) may save and aggregate the received data. The server computing device 200 may save and aggregate the received data in a manner similar or the same as that described above in relation to the execution of the application monitoring engine 440, mode management module 450, and/or other resource of the server computing device 200.

In an operation 840, the server computing device 200 may determine new conditions based on the aggregated data. For example, the server computing device 400 (and/or the mode management engine 450, or other resource of the server computing device 200) may determine new conditions. The server computing device 200 may determine new conditions in a manner similar or the same as that described above in relation to the execution of the mode management module 450, and/or other resource of the server computing device 200.

In an operation 850, the server computing device 200 may remove and/or make inactive existing conditions based on the aggregated data. For example, the server computing device 400 (and/or the mode management engine 450, or other resource of the server computing device 200) may remove and/or make inactive existing conditions. The server computing device 200 may remove and/or make inactive existing conditions in a manner similar or the same as that described above in relation to the execution of the mode management module 450, and/or other resource of the server computing device 200.

In an operation 860, the server computing device 200 may prepare reports to customer(s) based on the aggregated data and/or customer-specific data. For example, the server computing device 400 (and/or the mode management engine 450, the customer management engine 460, the reporting engine 470, or other resource of the server computing device 200) may prepare a report. The server computing device 200 may prepare a report in a manner similar or the same as that described above in relation to the execution of the 450, the customer management engine 460, the reporting engine 470, and/or other resource of the server computing device 200.

In an operation 870, the server computing device 200 may determine statistics and perform analysis based on the aggregated data. For example, the server computing device 400 (and/or the mode management engine 450, the customer management engine 460, the reporting engine 470, or other resource of the server computing device 200) may determine statistics and/or perform analysis. The server computing device 200 may determine statistics and/or perform analysis in a manner similar or the same as that described above in relation to the execution of the 450, the customer management engine 460, the reporting engine 470, and/or other resource of the server computing device 200.

While the disclosure discusses monitoring a single application, the server computing device 200 may monitor numerous applications across multiple client computing devices 100, 100*b*, . . . , 100*n*.

The foregoing disclosure describes a number of example embodiments for monitoring application flow of an application responsive to receiving a monitoring mode upon launch of a session of the application. The disclosed examples may include systems, devices, computer-readable storage media, and methods for measuring user action performance. For purposes of explanation, certain examples are described with reference to the components illustrated in FIGS. 1-8. The functionality of the illustrated components may overlap, however, and may be present in a fewer or greater number of elements and components. Further, all or part of the functionality of illustrated elements may co-exist or be distributed among several geographically dispersed locations. Moreover, the disclosed examples may be implemented in various environments and are not limited to the illustrated examples.

Further, the sequence of operations described in connection with FIGS. 1-8 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples. All such modifications and variations are intended to be included within the scope of this disclosure and protected by the following claims.

We claim:

1. A non-transitory machine-readable storage medium comprising instructions that are executable by a processor of a server computing device to cause the server computing device to:
   in response to receiving a request from a first client computing device for an indication of a monitoring mode to monitor a first application, determine that the first client computing device is to monitor an application flow of the first application running on the first client computing device in a regular mode based on a determination that previous application flow information of the first application monitored by the first client computing device fails to meet a predetermined set of conditions;
   send a first indication to the first client computing device to monitor the application flow of the first application in the regular mode;
   in response to receiving a request from a second client computing device for a monitoring mode to monitor the first application, determine that the second client computing device is to monitor an application flow of the first application running on the second client computing device in an extended mode based on a determination that previous application flow information of the first application monitored by the second client computing device meets the predetermined set of conditions; and
   send a second indication to the second client computing device to monitor the application flow of the first application in the extended mode,
   wherein monitoring the first application in the regular mode comprises obtaining a first set of information related to the application flow of the first application and monitoring the first application in the extended mode comprises obtaining a second set of information related to the application flow of the first application different from the first set of information, the second set of information comprising one or more of: the first set of information and additional information, or more detailed information as compared to the first set of information.

2. The non-transitory machine-readable storage medium of claim 1, further comprising instructions executable by the processor of the server computing device to:
   receive first monitoring information related to the application flow for the first application from the first client computing device; and
   save the first monitoring information in the storage medium.

3. The non-transitory machine-readable storage medium of claim 1, wherein the instructions are executable to cause the server computing device to:
   send an end indication to the first client computing device to end monitoring the application flow of the first application in the extended mode based on an end condition associated with the predetermined set of conditions being met.

4. The non-transitory machine-readable storage medium of claim 1, wherein the instructions are executable to cause the server computing device to:
   determine a new condition to include in the set of conditions based on the received first monitoring information from the first client computing device.

5. A server computing device comprising:
   a processor; and
   a memory storing instructions that when executed cause the processor to:
      in response to receiving a request from a first client device for a monitoring mode to monitor a first application, determine that the first client device is to monitor the application flow of the first application running on the first client device in a regular mode based on a determination that previous application flow information of the first application monitored by the first client device fails to meet a predetermined set of conditions;
      send an indication to the first client device to monitor the application flow of the first application in the regular mode;
      in response to receiving a request from a second client device for a monitoring mode to monitor the first application, determine that the second client device is to monitor an application flow of the first application running on the second client device in an extended mode based on a determination that previous application flow information of the first application monitored by the second client device meets the predetermined set of conditions; and
      send an indication to the second client device to monitor the application flow of the first application in the extended mode,
      wherein monitoring the first application in the regular mode comprises obtaining a first set of information related to the application flow of the first application and monitoring the first application in the extended mode comprises obtaining a second set of information related to the application flow of the first application different from the first set of information, the second set of information comprising one or more of: the first set of information and additional information, or more detailed information as compared to the first set of information.

6. The server computing device of claim 5, wherein the instructions are executable to cause the processor to:
   receive first monitoring information related to the application flow for the first application from the first client device;
   receive second monitoring information related to the application flow for the first application from the second client device; and
   aggregate the first monitoring information and the second monitoring information in a non-transitory machine readable storage medium coupled to the server computing device.

7. The server computing device of claim 6, wherein the instructions are executable to cause the processor to:

determine that the second monitoring information received from the second client device meets a predetermined condition of a set of conditions associated with the extended mode.

8. The server computing device of claim 6, wherein the instructions are executable to cause the processor to:
determine whether a bandwidth exists for the second client device to monitor the application flow of the first application in the extended mode subsequent to receiving the second monitoring information from the second client device; and
maintain the second client device to monitor the first application in the extended mode responsive to determining that bandwidth exists.

9. The server computing device of claim 6, wherein the instructions are executable to cause the processor to:
aggregate the first monitoring information and the second monitoring information; and
determine a new condition to include in the predetermined set of conditions based on the aggregated first monitoring information and the second monitoring information.

10. The server computing device of claim 5, wherein the instructions are executable to cause the processor to:
determine whether the first monitoring information related to the application flow for the first application from the first client device meets the predetermined set of conditions; and
in response to a determination that the first monitoring information meets the predetermined set of criteria, determine whether a total amount of bandwidth used by the first client device and the second client device is less than a predetermined threshold; and
in response to a determination that the total amount of bandwidth used by the first client device and the second client device is less than the predetermined threshold, send an indication to the first client device to change a monitoring mode from the regular mode to the extended mode.

11. A method comprising:
receiving, by a server device, a request for a first monitoring mode for monitoring application flow of a first application from a first client device;
determining, by a processor of the server device, that the first client device is to monitor the application flow of the first application in a regular mode based on a determination that previous application flow information of the first application monitored by the first client device fails to meet a predetermined set of conditions;
sending, by the processor of the server device, an indication to the first client device to monitor the application flow of the first application in the regular mode;
receiving, by the server device, first monitoring information related to the regular mode from the first client device;
receiving, by the server device, a second request for a second monitoring mode for monitoring application flow of the first application from a second client device;
determining, by the processor of the server device, that the second client device is to monitor an application flow of the first application running on the second client device in an extended mode based on a determination that previous application flow information of the first application monitored by the second client device meets the predetermined set of conditions; and
sending, by the processor, a second indication to the second client device to monitor the application flow of the first application in the extended mode,
wherein monitoring the first application in the regular mode comprises obtaining a first set of information related to the application flow of the first application and monitoring the first application in the extended mode comprises obtaining a second set of information related to the application flow of the first application different from the first set of information, the second set of information comprising one or more of: the first set of information and additional information, or more detailed information as compared to the first set of information.

12. The method of claim 11, further comprising:
receiving second monitoring information related to the extended mode from the second client device.

13. The method of claim 11, further comprising:
sending mode information to the first client computing device, the mode information comprising the predetermined set of conditions.

* * * * *